Sept. 16, 1958 E. J. LEONARD 2,852,701
ALL-RELAY FREQUENCY-CONTROLLED PULSE GENERATOR
Filed Dec. 23, 1955
FIG. I
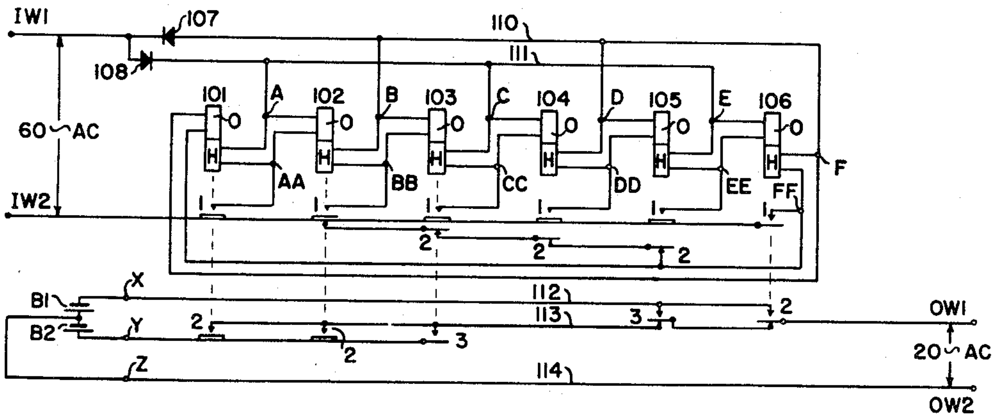
FIG. 2
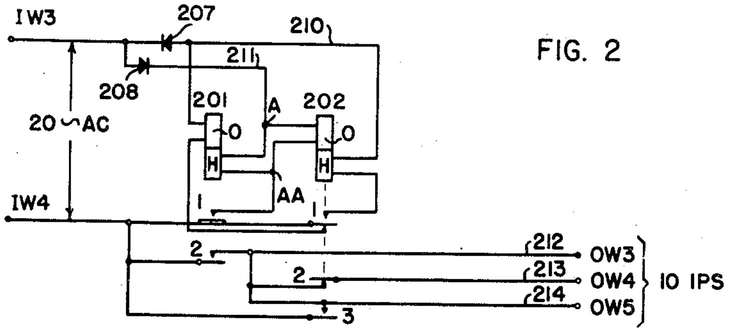

United States Patent Office 2,852,701

Patented Sept. 16, 1958

2,852,701

ALL-RELAY FREQUENCY-CONTROLLED PULSE GENERATOR

Edward J. Leonard, Chicago, Ill., assignor to International Telephone and Telegraph Corporation, New York, N. Y., a corporation of Maryland Application December 23, 1955, Serial No. 554,959

9 Claims. (Cl. 307—132)

This invention relates to an all-relay frequency-controlled pulse generator. Its principal object is to provide an economical and reliable pulse generator of the type employing electromagnetic relays as distinct from pulse generators of the motor-driven type.

The all-relay frequency-controlled pulse generator according to the present invention is so arranged that when connected to a source of alternating-current power, pulses are generated at a frequency which is a sub-multiple of the frequency of the alternating current power source. These generated pulses, either ground-interruption pulses or square-wave alternating current pulses, find numerous applications in telephone ringing arrangements, telephone register senders, and pulse-responsive test devices, for example.

Heretofore, pulse generators for generating ground-interrupted pulses or alternating-current pulses of a fixed repetition rate were usually constant-speed motor-driven devices. However, the availability of such devices for numerous applications was minimized as they were often cumbersome and expensive.

According to the present invention, pulse generator economies are realized by the employment of standard electromagnetic relays, such as those commonly used in telephone systems. One arrangement disclosed herein employs two relays to generate pulses having a constant repetition rate equal to one-half the applied frequency and another disclosed arrangement employs six relays to generate pulses having a constant repetition rate equal to one-third of the applied frequency. These two arrangements can be used separately or in combination to generate pulses of numerous repetition rates when powered from a single frequency source.

A feature of the pulse generator here employed resides in a control circuit arrangement wherein no power source connection other than the usual two-conductor power line is required to generate circuit-interrupted pulses, such arrangement enhancing the adaptability of the pulse generator for numerous applications.

A further feature of the present pulse generator resides in an arrangement for readily adapting it to generate either square-wave alternating current pulses or circuit-interrupted pulses, as desired, depending on its particular application.

The above-mentioned and other features and objects of this invention and the manner of attaining them will become more apparent, and the invention itself will be best understood, by reference to the following description of an embodiment of the invention taken in conjunction with the accompanying drawings comprising Figs. 1 and 2, wherein:

Fig. 1 shows a six-relay pulse generator for generating pulses at a frequency equal to one-third of the frequency of the connected source; and Fig. 2 shows a two-relay pulse generator for generating pulses at a frequency equal to one-half of the frequency of the connected source.

It has been chosen to illustrate the pulse generator of Fig. 1 as connected to a power source of 60-cycle alternating current and to illustrate the puse generator of Fig. 2 as connected to a power source of 20-cycle alternating current. In Fig. 1, the ouput wires (wires OW1 and OW2) are connected to generate square-wave alternating-current pulses having a frequency of 20-cycles which may be connected to the generator of Fig. 2 to serve as its power source. The output wires (wires OW2, OW3, and OW4) of the pulse generator of Fig. 2 are connected to generate ground-interrupted impulses at the repetition rate of 10 impulses per second, each output wire having a different make-break ratio.

Referring now in particular to Fig. 1 of the drawings, six relays 101 to 106 are shown interconnected to the input wires IW1 and IW2 through oppositely-poled rectifiers 107 and 108. The input wire IW1 is separated into two branches 110 and 111 and is connected to the pulse generator relays such that branch 110, including rectifier 107, is associated with the operate winding of the odd-numbered relays 101, 103, 105 and with the hold winding of the even-numbered relays while branch 111, including rectifier 108, is associated with the operate windings of the even-numbered relays 102, 104, and 106 and with the hold windings of the odd-numbered relays. Branch 110 of input wire IW1 is connected to the relay windings through junction points, B, D, and F while branch 111 is connected to the relay windings through junction points A, C, and E, these junction points being connected to the hold winding H of one relay and the operate winding O of the next succeeding relay.

Break contacts 1 of relay 102 and break contacts 2 of relays 103 to 105 constitute the starting circuit for the pulse generator and is normally effective only at a time the power source is active following a period of inactivity. It is assumed that alternating current of 60-cycle frequency appears across the input wires IW1 and IW2, wire IW2 serving as the common or grounded wire. Assuming the pulse generator to be in an idle condition with no relays operated, the first positive half cycle of 60-cycle alternating current appearing on input wire IW1 passes through rectifier 107 which is poled to permit current flow therethrough from positive half cycles, over conductor 110 to junction point F from whence it divides and flows through the operate winding O of relay 101 and the hold winding H of relay 106 to the common wire IW2 through break contacts 2 of relays 103 to 105 and break contacts 1 of relay 102. The current flow through the winding of relay 101 is of sufficient value to operate relay 101 but the current flow through the hold winding H of relay 106 is insufficient to operate it.

Make contacts 1 of operated relay 101 connect the common wire IW2 to the junction point AA between the hold winding H of relay 101 and the operate winding O of relay 102.

On completion of the first positive half-cycle of current, and the consequent reversal of current on the start of the first negative half-cycle, current flow through rectifier 107 ceases and current of opposite polarity then flows through oppositely-poled rectifier 108 to wire 111 and to junction point A. The current thereupon divides and flows through the hold winding H of relay 101 and through the operate winding O of relay 102 through contacts 1 of relay 101 to the common wire IW2.

Relay 102 operates and relay 101 remains operated. Make contacts 1 of relay 102 prepare an operate circuit for relay 103 responsive to the next positive half-cycle and at its break contacts 1 disconnects the common wire IW2 from the operate winding O of relay 101 and the hold winding H of relay 106 to prevent any reoperation thereof on the next succeeding positive half-cycle.

Responsive to the appearance of the second positive half-cycle on input wire IW1, current flows through rectifier 107 and over wire 110 to junction point B where it divides and flows through the operate winding O of relay 103 and the hold winding H of relay 102 to the common wire IW2 through make contacts 1 of relay 102. At such time, both the operate circuit and the holding circuit of relay 101 are open, and relay 101 restores. Make contacts 1 of operated relay 103 prepare an operate circuit for relay 104 and a hold circuit for relay 103 responsive to the next negative half-cycle, while its break contacts 2 maintain the starting circuit open.

The operation of the pulse generator in response to succeeding half cycles is similar to the operation just described, relays 104, 105 and 106 operating sequentially while relays 102, 103 and 104 restores sequentially. The appearance of positive half-cycle current on wire 110 at a time when relay 106 is operated, results in the operation of relay 101 which is then connected to the common wire IW2 through make contacts 1 of relay 106.

At such time, the pulse generator is recycled, the starting circuit being maintained ineffective as relay 106 is operated and its contacts 1 completes the path for the operation of relay 101.

Referring now to the work contacts associated with the output wires OW1 and OW2, it will be seen that wire 112 is connected to the negative pole of a center-tapped battery B1—B2 while wire 113 is associated through contacts 2 of relays 101 and 102 and through contacts 3 of relay 103 to the positive pole of such battery, wire 114 being connected to the center tap thereof. Accordingly, responsive to the operation of relay 101 on the first positive half-cycle of current, positive battery potential appears on wire 113 through make contacts 2 of relay 101, through break contacts 3 of relay 105 and break contacts 2 of relay 106 to the output wire OW1, such battery potential appearing across output conductors OW1 and OW2.

On the next three subsequent half cycles of input current, contacts 2 and 3 of relays 102 and 103, respectively, maintain positive battery potential across the output wires, and on the fourth half cycle, relay 105 operates and at its make contacts 3 transfers wire OW1 from wire 113 to wire 112, thereby placing negative battery potential across wires OW1 and OW2. When relay 106 operates, it being held operated until the operation of relay 102 thereafter, it maintains negative battery potential across the output conductors. When relay 102 operates relay 106 thereupon restores and substitutes a positive battery potential for the negative potential. In this manner, positive battery appears across conductors OW1 and OW2 through three half-cycles of input current whereupon it is replaced by negative battery potential for the next succeeding three half cycles. This generates a frequency of 20 cycles which is equal to one-third the input frequency.

While wires 112, 113 and 114 are shown associated with battery cells such as B1—B2, it is understood that either points X or Y could be connected to ground or the common wire IW2 to generate ground-interrupted pulses at a frequency of 20 impulses-per-second.

Referring now in particular to Fig. 2 of the drawings, it is assumed that input wires IW3 and IW4 are conducted to a 20-cycle alternating current supply and that rectifiers 207 and 208 are poled in a manner similar to rectifiers 107 and 108 of Fig. 1.

Responsive to the appearance of a positive half-cycle of current on wire IW3 when relays 201 and 202 are restored, current flows through rectifier 207 to the operate winding O of relay 201 which is connected to the common input wire IW4 through contacts 1 of relay 202. Relay 201 operates and at its make contacts 1 prepares an operate circuit for relay 202 responsive to the next negative half-cycle of current. Responsive to the appearance of the succeeding negative half-cycle of current appearing on the input wire IW3, current flows through rectifier 208 and over wire 211 to junction point A from whence it divides and flows through the operate winding O of relay 202 and through the hold winding H of relay 201 to junction point AA which is now connected to common wire IW4 through make contacts 1 of relay 201.

Relay 202 operates and at its make contacts 1 open-circuits the operate winding of relay 201 and at its make contacts 1 prepares a holding circuit for relay 202 on the next positive half-cycle. Responsive to the appearance of the second positive half-cycle, current flows through rectifier 207 and over wire 210 to the common wire IW4 through the holding winding H of relay 202 and holds relay 202 operated. With the operate circuit and hold circuit of relay 201 being open at such time, relay 201 restores.

On the following negative half-cycle of current, no current flows through rectifier 208 and over wire 211 as the circuit between wires IW3 and IW4 is open at make contacts 1 of now-restored relay 201, resulting in the restoration of relay 202.

On the subsequent positive half-cycle, relay 201 operates as before described to initiate a second cycle of operation of the pulse generator.

From the foregoing, it can be seen that responsive to the first half cycle, relay 201 operates; on the second half cycle, relay 202 operates and relay 201 is maintained operated; on the third half-cycle, relay 201 is restored; and on the fourth half cycle, relay 202 restores. Accordingly, ground appears on each of the wires 212 to 214 once every two complete cycles of input frequency, generating ground-interrupted impulses at a ten impulse per second rate. Since relay 201 is operated one-half of the two complete cycles, ground appears on wire 212 for two half-cycles of input frequency generating the 10 I. P. S. pulses with a 50–50 make-break ratio.

Since relay 101 is operated by itself for only one-half cycle, ground on make contacts 2 of relay 201 and break contacts 2 of relay 202 ground wire 231 for one-half cycle only, thereby generating the 10 I. P. S. ground-interrupted impulses with a make-break ratio of 25–75.

Make contacts 2 of relay 201 and make contacts 3 of relay 202 maintain ground on wire 214 through three half cycles and remove such ground for one one-half cycle period, generating 10 I. P. S. ground-interrupted pulses having a make-break ratio of 75–25.

These output wires 212, 213, and 214 may be employed for testing purposes to determine the response of any device to the various make and break ratios at the fixed impulse rate of 10 impulses per second.

The described arrangement for generating ground-interrupted impulses of varying ratios may be applied to the pulse generator of Fig. 1, the ratios easily obtained therein being a 50–50 ratio, a 33⅓–66⅔ ratio, and 66⅔–33⅓ ratio.

From the foregoing, it can readily be seen that an alternating current source of 60 cycles may be utilized to generate pulses having a frequency one-third of the input frequency with the pulse generator of Fig. 1 and when the output thereof is connected to the input conductors of the pulse generator of Fig. 2, pulses are generated at a rate of 10 impulses per second. The output of the pulse generator of Fig. 1 could readily be applied to provide 20-cycle ringing current, or the like, as desired.

While I have described above the principles of my invention in connection with specific apparatus, it is to be clearly understood that this description is made only by way of example and not as a limitation to the scope of my invention.

I claim:

1. A pulse generator comprising a series of electromagnetic relays responsive to current from an alternating-current source, contact means on any relay preceding the last for operatively associating the next succeeding relay with the said source and contact means on the last relay for operatively associating the first relay with the said source, means including the said contact means for operating the relays in succession responsive respectively to successive half-cycles of alternating current and means for restoring the relays in the same succession responsive respectively to succeeding successive half-cycles of the alternating current to operate and restore the series of relays repeatedly, means rendering the said operation and the said restoration of any relay responsive to respective ones of said half cycles which are of the same polarity, and means controlled by the said operation and restoration of the series of relays for generating pulses of a frequency proportional to and lower than the frequency of the alternating current source.

2. A pulse generator according to claim 1 wherein the said means for operating the relays in succession includes impedance devices which permit current flow in one direction responsive to one half-cycle of current and at least reduce any reverse current flow responsive to the next succeeding half-cycle of current.

3. A pulse generator according to claim 2 wherein the said impedance devices are connected between the relays and the alternating current source, and wherein the impedance devices connected to the relays which operate in response to a first half-cycle of the alternating current are poled in one direction and the impedance devices connected to the relays which operate in response to the next succeeding half-cycle are poled in the opposite direction.

4. In a pulse generator according to claim 1, the said means for operating and restoring the relays repeatedly including relay winding means on each relay, the said means for operating any relay including means for energizing the relay winding means thereof responsive to a half cycle of alternating current of one polarity, and the said means for restoring the said any relay including means for deenergizing the relay winding means thereof responsive to the next succeeding half-cycle of alternating current of the same polarity.

5. In a pulse generator according to claim 1, each of said relays including an operating winding and a holding winding, and means included in the said means for operating and restoring the relays repeatedly for energizing the operate winding of any of said relays responsive to a half-cycle of alternating current and for energizing the holding winding thereof on the next succeeding half-cycle.

6. A pulse generator according to claim 5 wherein the said series of relays is an endless series with the first relay preceding the second and succeeding the last, means for associating the holding winding of any relay with the operating winding of the next succeeding relay such that the half cycle of operating current for any relay is the half-cycle of holding current for the preceding relay.

7. In a pulse generator comprising first and second electromagnetic relays responsive to current from an alternating current source, contact means on any relay for operatively associating the other relay with the said source, means including the said contact means for operating the relays in succession responsive respectively to successive half-cycles of alternating current and means for restoring the relays in the same succession responsive respectively to succeeding half-cycles of alternating current to operate and restore the said two relays repeatedly, and means controlled by the said operation of the relays for generating pulses of a frequency equal to one-half the frequency of the said alternating current source.

8. In a pulse generator according to claim 7, each of said relays including an operating winding and a holding winding, means included in the said means for operating the relays in succession for energizing the operate winding of the first relay responsive to a first half-cycle of alternating current and for energizing the holding winding thereof and the operate winding of the second relay responsive to the next succeeding half-cycle of alternating current, and means included in the said means for restoring the relays in succession for energizing the holding winding of the second relay and deenergizing the holding winding of the first relay responsive to the first half-cycle of current after the said operation of the second relay and for thereafter deenergizing the holding winding of the second relay responsive to the next succeeding half-cycle of current.

9. In a pulse generator according to claim 1, the said means for generating pulses of a frequency proportional to and lower than the frequency of the said alternating current source including means for varying the ratio of the time durations of successive half cycles of the generated pulses.

References Cited in the file of this patent

UNITED STATES PATENTS

| | | |
|---|---|---|
| 1,813,969 | Smith | July 14, 1931 |
| 1,837,337 | Roberts | Dec. 22, 1931 |
| 2,561,073 | Schouten et al. | July 17, 1951 |
| 2,563,824 | Dunlap et al. | Aug. 14, 1951 |